United States Patent
Corrado et al.

(10) Patent No.: US 6,925,053 B2
(45) Date of Patent: Aug. 2, 2005

(54) METHOD AND APPARATUS FOR PROVIDING BACKUP TELECOMMUNICATION SERVICE

(75) Inventors: Joseph Michael Corrado, Chicago, IL (US); Kenneth Donald Frantzen, West Chicago, IL (US); David John Garney, Glen Ellyn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 931 days.

(21) Appl. No.: 09/886,436

(22) Filed: Jun. 21, 2001

(65) Prior Publication Data

US 2002/0196739 A1 Dec. 26, 2002

(51) Int. Cl.[7] .................................. H04L 1/22
(52) U.S. Cl. ..................... 370/217; 379/29.05
(58) Field of Search .................. 370/217, 220, 370/225; 379/29.05

(56) References Cited

U.S. PATENT DOCUMENTS

| 5,418,776 A | 5/1995 | Purkey et al. |
| 5,636,202 A | 6/1997 | Garney et al. |
| 5,680,391 A * | 10/1997 | Barron et al. ............... 370/241 |
| 5,920,609 A * | 7/1999 | Toumani et al. ......... 379/27.01 |
| 6,282,266 B1 * | 8/2001 | Przyblyski et al. ...... 379/27.04 |

FOREIGN PATENT DOCUMENTS

WO  WO 9966700 A2 * 12/1999  ............ H04M/3/42

* cited by examiner

Primary Examiner—Melvin Marcelo

(57) ABSTRACT

A technique for providing telecommunications service is disclosed that uses a test bus to test customer subscriber lines and to provide a connection between a customer subscriber line and transmission equipment, which handles outbound backup calls. This backup transmission equipment can be inexpensively retrofitted into switches and remote terminal equipment in the field. The illustrative embodiment of the present invention comprises: a plurality of customer subscriber lines; a metallic test bus that can be electrically connected to any of the plurality of customer subscriber lines; drop test logic for testing at least one electrical characteristic of any of the plurality of customer subscriber lines via the metallic test bus; and transmission equipment for providing telecommunications service to any of the plurality of customer subscriber lines via the metallic test bus.

20 Claims, 4 Drawing Sheets

100

200

METHOD AND APPARATUS FOR PROVIDING BACKUP TELECOMMUNICATION SERVICE

FIELD OF THE INVENTION

The present invention relates to telecommunications in general, and, more particularly, to a technique for enabling remote terminal equipment to provide reliable telecommunications service.

BACKGROUND OF THE INVENTION

FIG. 1 depicts a schematic diagram of a telecommunications system in the prior art, which comprises: central office 102, remote terminal equipment 101, digital carrier loop 105, wireline terminals 108-1 through 108-m, which are connected to central office 102 via customer subscriber lines 109-1 through 109-m, respectively, and wireline terminals 110-1 through 110-n, which are connected to remote terminal equipment 101 via customer subscriber lines 111-1 through 111-n.

Central office 102 provides nominal telecommunications service to customer subscriber lines 109-1 through 109-m, in well-known fashion, and nominal telecommunications service to customer subscriber lines 111-1 through 111-n via remote terminal equipment 101 and digital carrier loop 105.

Typically, remote terminal equipment is used when the distance between a central office and a wireline terminal is too great (e.g., more than a few kilometers, etc.). In such cases, remote terminal equipment is placed geographically near to the wireline terminals and a multiplexed digital carrier loop carries multiple simultaneous calls between the central office and the remote terminal equipment. In this circumstance, the remote terminal equipment functions as a concentrator.

When digital carrier loop 105 experiences a failure (e.g., its cable was accidentally cut by ditch digging equipment, etc.), telecommunications service to all of wireline terminals 110-1 through 110-n is unavailable. Although gaps in telecommunications service can be rare, even a rare gap can be catastrophic when emergency situations arise. Therefore, the need exists for a technique for providing backup telecommunications service to customer subscriber lines serviced by remote terminal equipment.

SUMMARY OF THE INVENTION

The present invention is a technique for providing backup outbound telecommunications service without some of the costs and disadvantages associated with techniques in the prior art. In particular, the illustrative embodiment enables remote terminal equipment to be inexpensively retrofitted to provide backup outbound telecommunications service when the nominal telecommunications service is unavailable.

Most remote terminal equipment in the prior art incorporates drop test logic and a metallic test bus for testing the physical (e.g., electrical, optical, etc.) characteristics of any customer subscriber line connected to the remote terminal equipment. This is well known in the prior art. The illustrative embodiment of the present invention, however, uses the metallic test bus to also provide a connection between a customer subscriber line and backup transmission equipment, which provides backup outbound telecommunications service via a loop to another central office. This backup transmission equipment can be inexpensively retrofitted into switches and remote terminal equipment in the field.

The illustrative embodiment of the present invention comprises: a plurality of customer subscriber lines; a metallic test bus that can be electrically connected to any of the plurality of customer subscriber lines; drop test logic for testing at least one electrical characteristic of any of the plurality of customer subscriber lines via the metallic test bus; and transmission equipment for providing telecommunications service to any of the plurality of customer subscriber lines via the metallic test bus.

DETAILED DESCRIPTION

Figure 1:
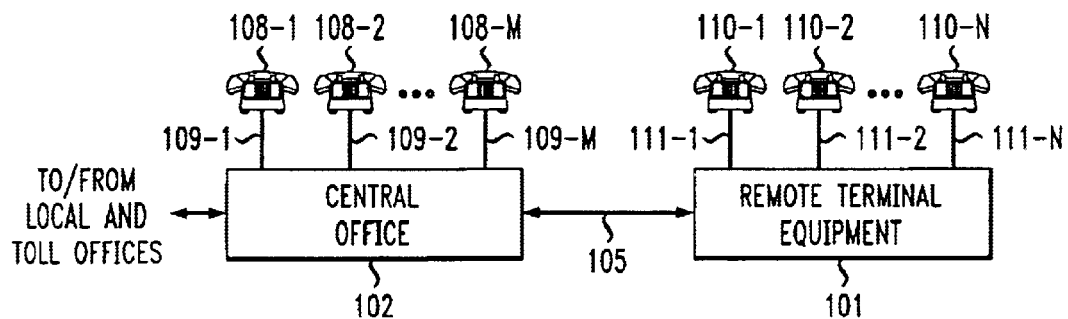
FIG. 1 depicts a schematic diagram of a telecommunications system in the prior art.
Figure 2:
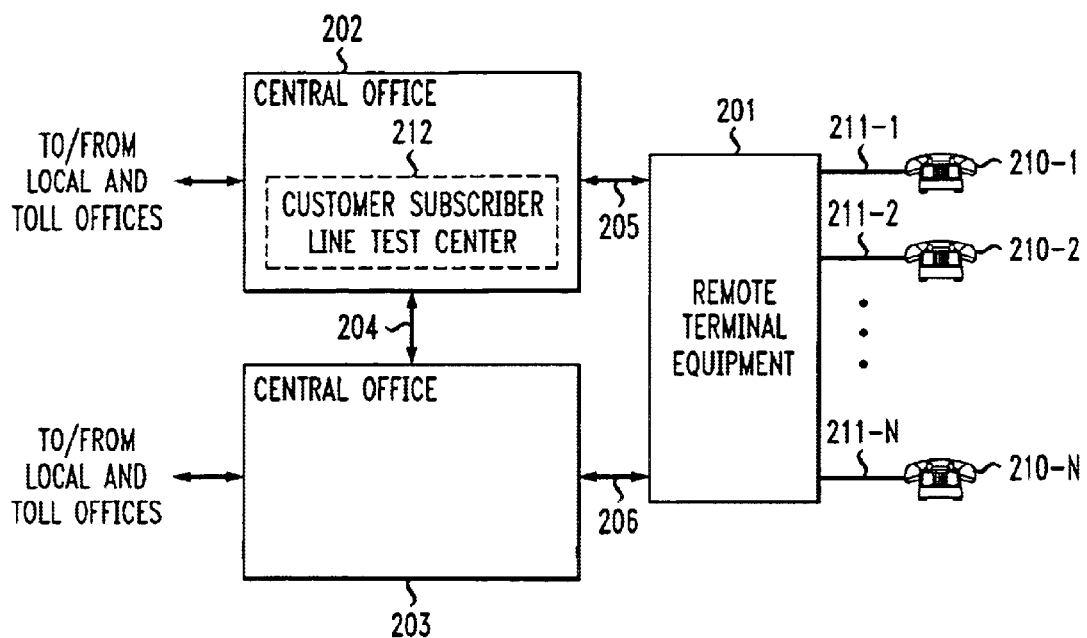
FIG. 2 depicts a block diagram of the illustrative embodiment of the present invention.

FIG. 2 depicts a block diagram of the illustrative embodiment of the present invention, which comprises: remote terminal equipment 201, central office 202, digital loop carrier 205, central office 203, interoffice digital loop carrier 204, loop 206, customer terminals 210-1 through 210-n, and customer subscriber lines 211-1 through 211-n.

Each of customer subscriber lines 211-1 through 211-n are metallic twisted pair, as is well known to those skilled in the art. In some alternative embodiments of the present invention, each of customer subscriber lines 211-1 through 211-n are coaxial cable, and in some other alternative embodiments, each of customer subscriber lines 211-1 through 211-n are optical fiber. In any case, it will be clear to those skilled in the art how to make and use customer subscriber lines 211-1 through 211-n.

Customer terminals 210-1 through 210-n are well known to those skilled in the art and enable a customer (not shown) to interface with remote terminal equipment 201 via customer subscriber lines 211-1 through 211-n. Each of customer terminals 210-1 through 210-n is capable of converting audio, video, or data signals, or any combination of them into the proper type of signal (i.e., electrical or optical) for transmission over customer subscriber lines 211-1 through 211-n. Furthermore, each of customer terminals 210-1 through 210-n is capable of receiving a signal, whether electrical or optical, from customer subscriber lines 211-1 through 211-n and of converting them into audio, video, or data signals, as appropriate. In any case, it will be clear to those skilled in the art how to make and use customer terminals 210-1 through 210-n.

Remote terminal equipment 201 provides, as is described in greater detail below and with respect to FIGS. 3 through 7, telecommunications service (e.g., dial tone, etc.) to customer subscriber lines 211-1 through 211-n. Although in some alternative embodiments of the present invention remote terminal equipment can establish a call between two or more customer subscriber lines 211-1 through 211-n (i.e., remote terminal equipment 201 acts as a switch), remote terminal equipment 201 acts as a concentrator for central office 202 via digital loop carrier 205. When there is a failure of digital loop carrier 205, remote terminal equipment 201 provides backup telecommunications service, albeit at a diminished capacity, to some or all of customer subscriber lines 211-1 through 211-n via loop 206 and central office 203. This is also described in greater detail below and with respect to FIGS. 3 through 7. Furthermore, as is described in greater detail below and with respect to FIGS. 3 through 7, remote terminal equipment 201 comprises equipment that enables the remote testing of any of customer subscriber lines 211-1 through 211-n by a remote customer subscriber line test center as is well known to those skilled in the art.

Central office 202 provides telecommunications service to customer subscriber lines 211-1 through 211-n via remote terminal equipment and digital loop carrier 205. Central office 202 also comprises a customer subscriber line test center which enables the remote testing of any customer subscriber lines 211-1 through 211-n. It will be clear to those skilled in the art how to make and use central office 202.

Central office 203 provides telecommunications service to some or all of customer subscriber lines 211-1 through 211-n via remote terminal equipment and loop 206. In some alternative embodiments of the present invention, loop 206 is a wireless telecommunications channel between a transceiver (not shown) in remote terminal equipment 201 and a transceiver (not shown) in central office 203. In either case, from the perspective of central office 203, remote terminal equipment 201 appears to be a conventional customer terminal, and the telecommunications service provided to remote terminal equipment 201 by central office 203 is identical to that provided by central office 202 and remote terminal equipment 201 to customer subscriber lines 211-1 through 211-n.

Figure 3:
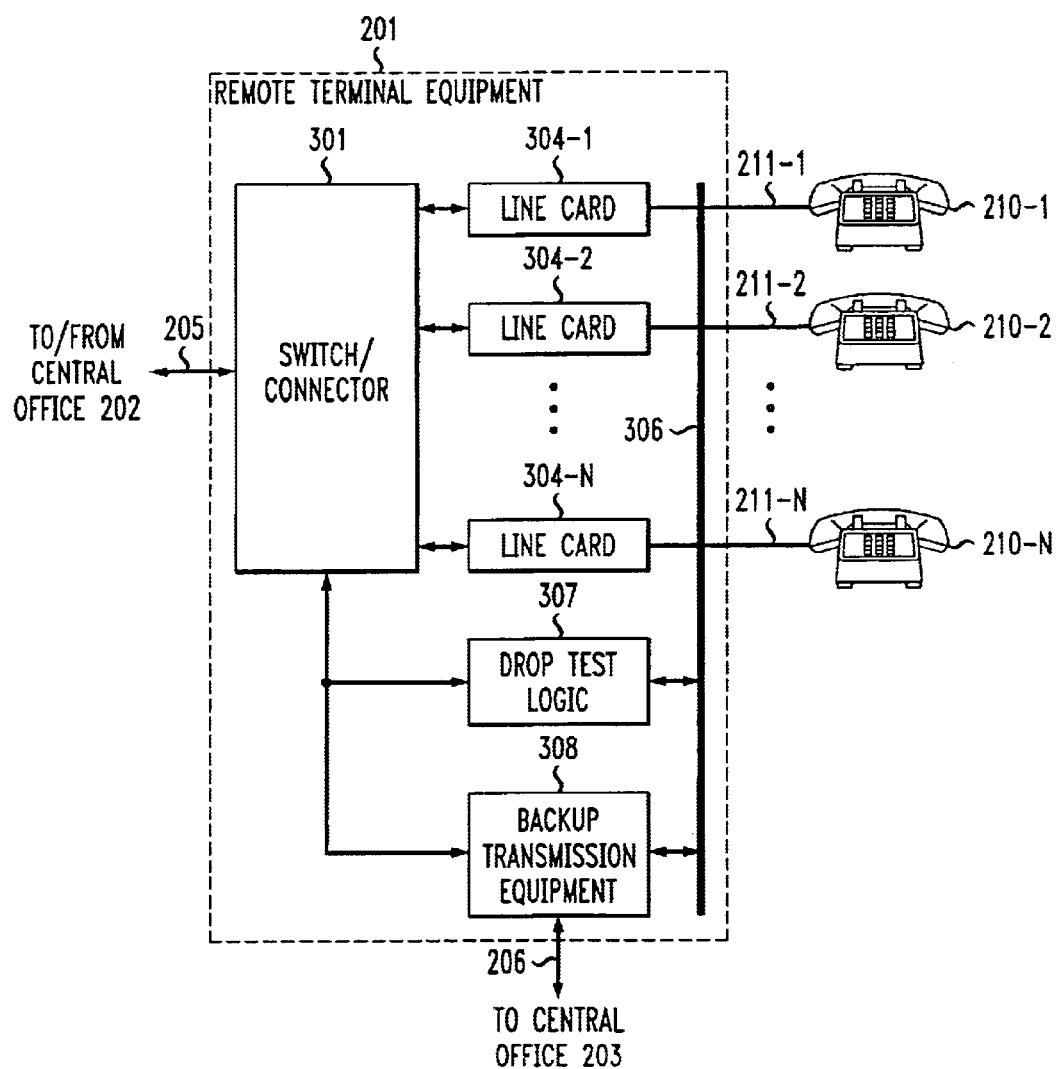
FIG. 3 depicts a block diagram of the salient components of remote terminal equipment 201 of FIG. 2.

FIG. 3 depicts a block diagram of the illustrative embodiment of remote terminal equipment 201, which comprises: switch/concentrator 301, a plurality of line cards 304-1 through 304-n, test bus 306, drop test logic 307, and backup transmission equipment 308, interrelated as shown. Each of these components is described below and with respect to FIGS. 4 through 7.

Figure 4:
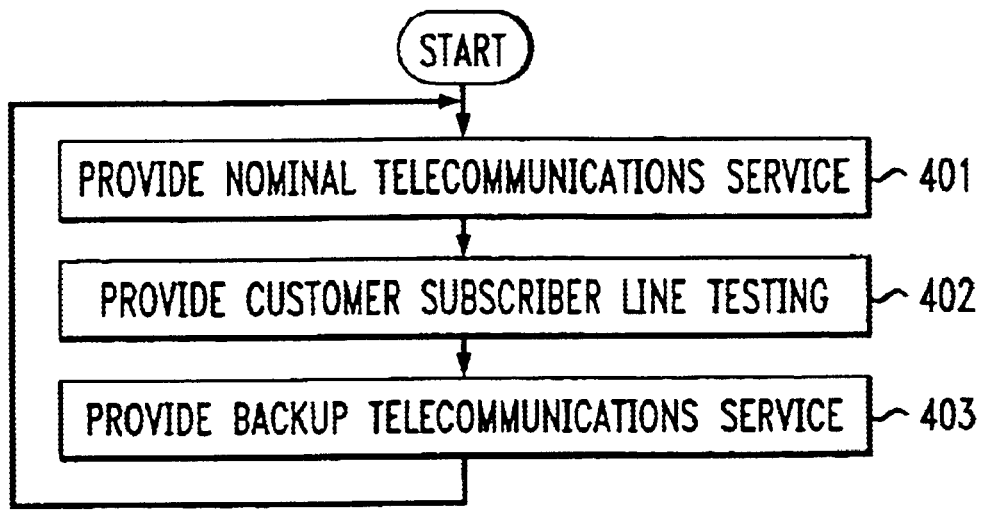
FIG. 4 depicts a flowchart of the operation of the illustrative embodiment of the present invention.

FIG. 4 depicts a flowchart of the three functions performed by the illustrative embodiment.

At task 401, the illustrative embodiment provides nominal telecommunications service to customer subscriber lines 203-1 through 203-n.

At task 402, the illustrative embodiment provides electrical testing capability of customer subscriber lines 203-1 through 203-n.

At task 403, the illustrative embodiment provides backup telecommunications service to customer subscriber lines 203-1 through 203-n.

These three functions can be performed in any order and both tasks 302 and 303 can be performed concurrently with task 301. To facilitate an understanding of the illustrative embodiment, each of these three functions is described in turn.

I. Providing Nominal Telecommunications Service

Figure 5:
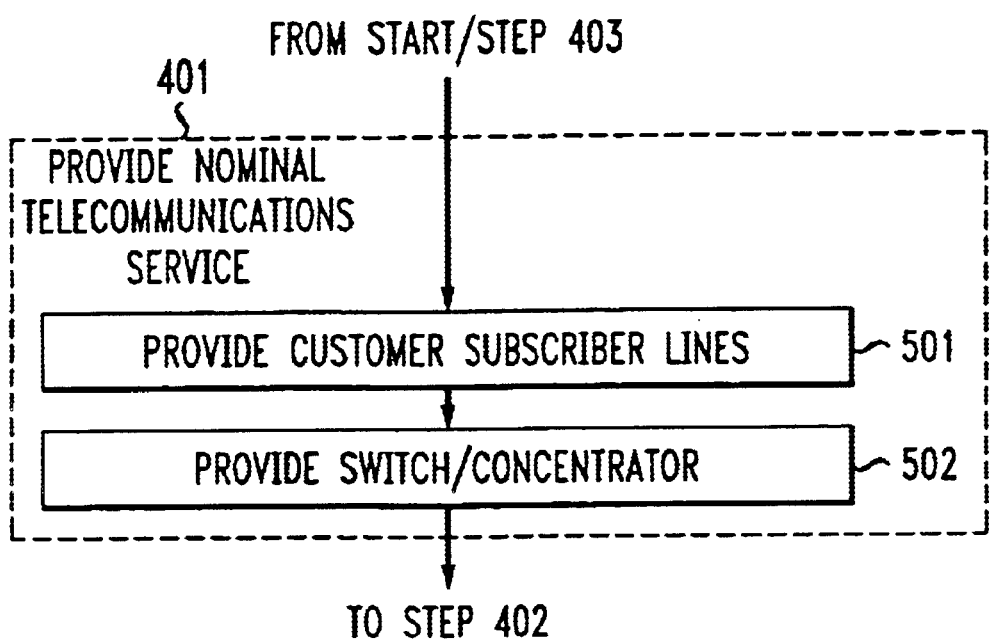
FIG. 5 depicts a flowchart of the salient tasks performed by the illustrative embodiment in performing task 401.

FIG. 5 depicts a flowchart of the salient tasks performed by the illustrative embodiment in performing task 401. Remote terminal equipment 201 uses switch/concentrator 301, customer terminals 202-1 through 202-n, customer subscriber lines 203-1 through 203-n, line cards 204-1 through 204-n, and digital loop carrier 205 to perform task 401. It is well known to those skilled in the art how to perform task 401.

At task 501, customer subscriber lines 203-1 through 203-n are provided. In accordance with the illustrative embodiment, each customer subscriber line comprises, in well-known fashion, a pair of electrically conductive wires (not shown) that are called "tip" and "ring." Each customer subscriber line can be either metallic twisted-pair or coaxial cable. In some alternative embodiments of the present invention, each customer subscriber line is optical fiber. In either case, it will be clear to those skilled in the art how to provide customer subscriber lines 203-1 through 203-n.

At task 502, switch/concentrator 301 is provided and connected to customer subscriber lines 203-1 through 203-n. In accordance with the illustrative embodiment, switch/concentrator 201 is capable of:

i. switching calls between customer subscriber lines 203-1 through 203-n; or ii. concentrating customer subscriber lines 203-1 through 203-n into digital loop carrier 205; or iii. both i and ii.

It will be clear to those skilled in the art that function (i) is typically provided by a switch (e.g., 5ESS, etc.) and that function (ii) is typically provided by a concentrator (e.g., SLC 96, SLC 5, SLC 2000, etc.). In accordance with the illustrative embodiment, switch/concentrator 201 is connected to each customer subscriber line via a line card (e.g., 204-1, etc.). It is well known to those skilled in the art how to provide switch/concentrator 301 and how to connect it to customer subscriber lines 203-1 through 203-n to provide nominal telecommunications service to customer subscriber lines 203-1 through 203-n. For the purposes of this specification, the phrase "nominal telecommunications service" is defined as:

i. switching calls between customer subscriber lines 203-1 through 203-n; or concentrating customer subscriber lines 203-1 through 203-n into digital loop carrier 205; or iii. both i and ii.

It is well known to those skilled in the art how to provide nominal telecommunications service to customer subscriber lines 203-1 through 203-n.

II. Providing Electrical Testing Capability

Figure 6:
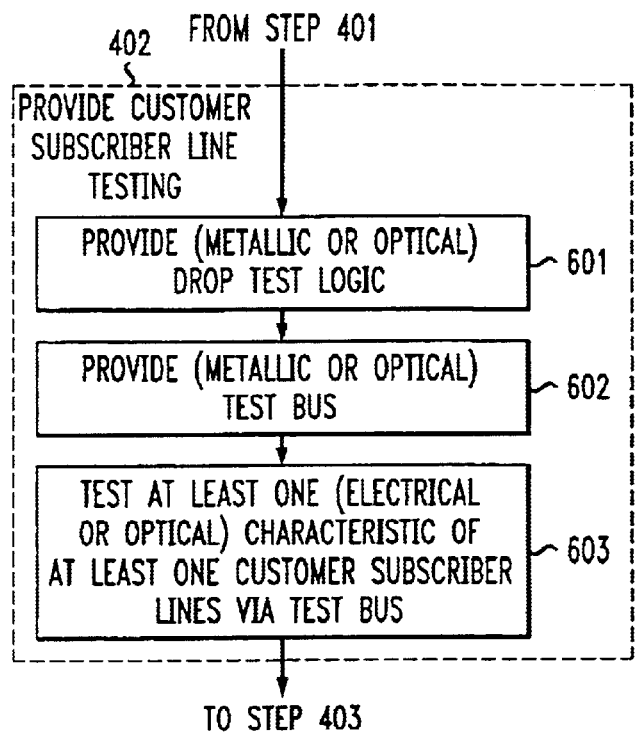
FIG. 6 depicts a flowchart of the salient tasks performed by the illustrative embodiment in performing task 402.

FIG. 6 depicts a flowchart of the salient tasks performed by the illustrative embodiment in performing task 402. Remote terminal equipment 201 uses switch/concentrator 301, digital loop carrier 305, test bus 306, and drop test logic 307 to test at least one characteristic of any of customer subscriber lines 203-1 through 203-n. It is well known to those skilled in the art how to perform task 402.

Occasions arise when the quality of telecommunications service provided to a customer subscriber line is in question. On those occasions, it is advantageous for the telecommunications service provider to be capable of testing the characteristics of the customer subscriber line associated with that customer. One way that this could be accomplished is by sending a lineperson to the customer's premises to measure the characteristics of the customer's subscriber line. In the alternative, remote terminal equipment 201 could be configured to be capable of testing the characteristics of the customer subscriber line via commands transmitted from a remote testing facility (e.g., a customer subscriber line test center). In general, the second option is faster and more economical, and is, therefore, preferred.

Therefore, at task 601, drop test logic 307 is provided, which is capable of testing at least one characteristic of a customer subscriber line. When customer subscriber lines 203-1 through 203-*n* are metallic, drop test logic 307 might test, for example, the impedance of a customer subscriber line. In contrast, when customer subscriber lines 203-1 through 203-*n* are optical fibers, drop test logic 307 might test, for example, the reflectivity of a customer subscriber line. In either case, it is well known to those skilled in the art how to perform task 601.

At task 602, test bus 306 is provided, which is capable of being connected to any of customer subscriber lines 203-1 through 203-*n*. When customer subscriber lines 203-1 through 203-*n* are metallic, test bus 306 is a two-conductor metal bus wherein one conductor electrically connects to the tip conductor of a customer subscriber line and the other conductor electrically connects to the ring conductor of the customer subscriber line. When customer subscriber lines 203-1 through 203-*n* are optical fiber, test bus 306 comprises one or more optical fibers that appropriately connect to the customer subscriber line. In either case, it is well known to those skilled in the art how to perform task 602.

At task 603, drop test logic 307 receives a command from customer subscriber loop test center 212 (shown in FIG. 2), via digital loop carrier 205 and switch/concentrator 301, to test at least one (electrical or optical as the case may be) characteristic of a customer subscriber line and to report the test results back to customer subscriber loop test center 212. To accomplish this task, drop test logic 307 directs test bus 306 be temporarily connected to the customer subscriber line to be tested. Drop test logic 307 then conducts the test as directed. When drop test logic 307 has completed the test, it directs test bus 306 be disconnected from the customer subscriber line and reports the test results back to customer subscriber loop test center 212 via digital loop carrier 205 and switch/concentrator 201. In this way, the physical characteristics of any customer subscriber line can be quickly and inexpensively tested. It is well known to those skilled in the art how to perform task 603.

III. Providing Outbound Backup Telecommunications Service

Figure 7:
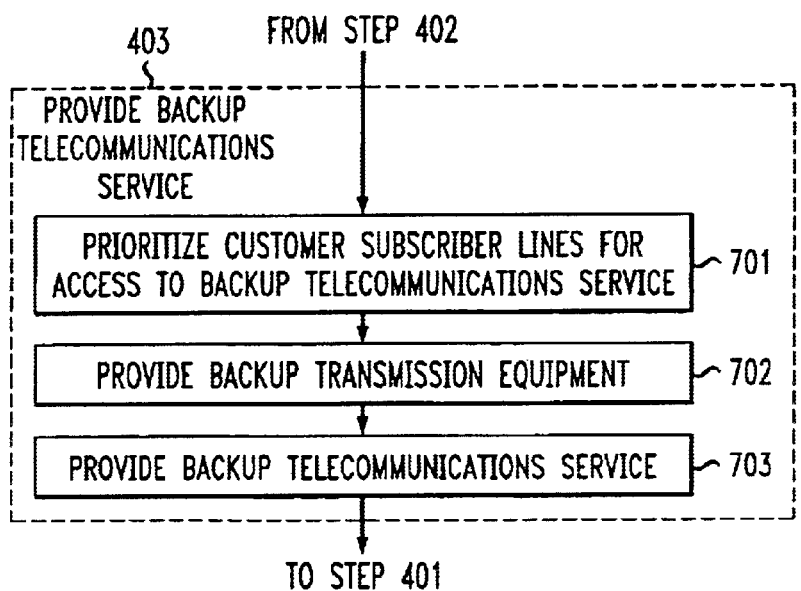
FIG. 7 depicts a flowchart of the salient tasks performed by the illustrative embodiment in performing task 403.

FIG. 7 depicts a flowchart of the salient tasks performed by the illustrative embodiment in performing task 403. Remote terminal equipment 201 uses test bus 306, backup transmission equipment 308, and loop 209 to provide backup telecommunications service to customer subscriber lines 203-1 through 203-*n*. For the purposes of this specification, the phrase "backup telecommunications service" is defined as providing nominal outbound telecommunications service to a customer subscriber line via a test bus.

At task 701, customer subscriber lines 203-1 through 203-*n* are optionally prioritized for access to backup transmission equipment 308. Because more than one customer subscriber line can vie for backup transmission equipment 308, contention can arise between the customer subscriber lines. Therefore, to resolve the contention it might be advantageous to prioritize customer subscriber lines 203-1 through 203-*n* for access to backup transmission equipment 308. In the illustrative embodiment, a higher priority customer subscriber line will seize access to backup transmission equipment 308 from a lower priority customer subscriber line, but a lower priority customer subscriber line will not seize access to backup transmission equipment 308 from a higher priority customer subscriber line.

In some alternative embodiments of the present invention, customer subscriber lines 203-1 through 203-*n* are not prioritized for access to backup transmission equipment 308. In these embodiments, whenever one customer subscriber line seizes access to backup transmission equipment 308, all of the other customer subscriber lines are denied telecommunications service until the customer subscriber line with access to backup transmission equipment 308 voluntarily releases it.

When the number of customer subscriber lines (i.e., the number of customer subscriber lines=n) is small (e.g., less than 50), the likelihood of contention might be so small that prioritization is not necessary. In contrast, when the number of customer subscriber lines is high, the likelihood of contention might be high enough that prioritization is either necessary or advantageous.

In situations where multiple test buses exist or can be added, it will be clear to those skilled in the art that multiple simultaneous backup service pathways and calls can be provided. In situations where prioritization is implemented, priority might be given to: facilities with a perceived greater need for highly reliable telecommunications service (e.g., nursing homes, schools, hospitals, automatic alarm dialers, etc.) or to those parties who are willing to pay a premium for highly reliable telecommunications service.

In either case, it will be clear to those skilled in the art how to prioritize customer subscriber lines 203-1 through 203-*n* for access to backup transmission equipment 308.

At task 702, backup transmission equipment 308 is provided. Backup transmission equipment 308 is capable of:

i. being notified by switch/concentrator 301 that nominal telecommunications service cannot currently be provided to customer subscriber lines 203-1 through 203-*n* by central office 202 (perhaps because of a failure in digital loop carrier 205 or in central office 202);

ii. being notified by switch/concentrator 301 that which of wireline terminals 210-1 through 210-*n* desires to place a call (i.e., has gone off hook);

iii. directing drop test logic 307 to disconnect any test equipment from test bus 306, if necessary, and iv. directing test bus 306 to be connected to the highest priority customer subscriber line associated with the wireline terminal that went off hook;

v. connecting test bus 306 with loop 206 to provide backup telecommunications service to the customer subscriber line connected to test bus 306.

The backup transmission equipment advantageously has an interfacing unit that provides talk battery or otherwise conditions the line for proper interfacing with the backup transmission equipment. When loop 206 is a cellular telephone connection, backup transmission equipment 308 might need to comprise an auto-dialer to reach central office 203 through the cellular telephone system.

In some alternative embodiments of the present invention, backup transmission equipment 308 does not connect backup telecommunications service to the customer subscriber line connected to test bus 306, but merely plays a recording that indicates that nominal telecommunications service is unavailable.

At task 703, backup transmission equipment 308 provides backup telecommunications service to customer subscriber lines 203-1 through 203-*n* via test bus 306. When:

i. switch/concentrator 301 indicates that nominal telecommunications service cannot currently be provided to customer subscriber lines 203-1 through 203-*n* by central office 202, and ii. switch/concentrator 301 indicates that the wireline terminals associated with one of customer subscriber lines 203-1 through 203-*n* has gone off hook, then backup transmission equipment 308:

i. directs test bus 306 to be connected to the customer subscriber line (assuming it is the highest priority customer subscriber line when the customer subscriber lines are prioritized), and ii. connects test bus 306 with loop 206 to provide backup telecommunications service to the customer subscriber line connected to test bus 306.

When the wireline terminal to which backup telecommunications service is being provided no longer desires telecommunications service (i.e., goes on hook), switch/concentrator 301 indicates such to backup telecommunications equipment 308. In this event, backup telecommunications equipment 308:

i. directs test bus 306 to be disconnected to the customer subscriber line, and ii. tears down the connection via loop 206 to central office 203.

In this manner, the illustrative embodiment provides backup telecommunications service to customer subscriber lines 203-1 through 203-$n$.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:

a plurality of customer subscriber lines;

a metallic test bus that can be electrically connected to any of said plurality of customer subscriber lines;

drop test logic for testing at least one electrical characteristic of any of said plurality of customer subscriber lines via said metallic test bus; and transmission equipment for providing telecommunications service to any of said plurality of customer subscriber lines via said metallic test bus.

2. The apparatus of claim 1 further comprising a concentrator for multiplexing said plurality of customer subscriber lines into a trunk.

3. The apparatus of claim 1 further comprising a switch for switching calls between said plurality of customer subscriber lines.

4. The apparatus of claim 1 wherein said transmission equipment comprises a wireless terminal.

5. The apparatus of claim 1 wherein said transmission equipment comprises a customer subscriber line.

6. The apparatus of claim 1 wherein said plurality of customer subscriber lines are prioritized for access to said transmission equipment.

7. A method comprising:

providing a plurality of customer subscriber lines;

providing a metallic test bus;

testing at least one electrical characteristic of any of said plurality of customer subscriber lines via said metallic test bus; and providing telecommunications service to any of said plurality of customer subscriber lines via said metallic test bus.

8. The method of claim 7 further comprising multiplexing said plurality of customer subscriber lines into a trunk.

9. The method of claim 7 further comprising switching calls between said plurality of customer subscriber lines.

10. The method of claim 7 further comprising prioritizing said plurality of customer subscriber lines for access to telecommunications service via said metallic test bus.

11. An apparatus comprising:

a plurality of customer subscriber lines;

an optical test bus that can be optically connected to any of said plurality of customer subscriber lines;

drop test logic for testing at least one optical characteristic of any of said plurality of customer subscriber lines via said optical test bus; and transmission equipment for providing telecommunications service to any of said plurality of customer subscriber lines via said optical test bus.

12. The apparatus of claim 11 further comprising a concentrator for multiplexing said plurality of customer subscriber lines into a trunk.

13. The apparatus of claim 11 further comprising a switch for switching calls between said plurality of customer subscriber lines.

14. The apparatus of claim 11 wherein said transmission equipment comprises a wireless terminal.

15. The apparatus of claim 11 wherein said transmission equipment comprises a customer subscriber line.

16. The apparatus of claim 11 wherein said plurality of customer subscriber lines are prioritized for access to said transmission equipment.

17. A method comprising:

providing a plurality of customer subscriber lines;

providing a optical test bus;

testing at least one optical characteristic of any of said plurality of customer subscriber lines via said optical test bus; and providing telecommunications service to any of said plurality of customer subscriber lines via said optical test bus.

18. The method of claim 17 further comprising multiplexing said plurality of customer subscriber lines into a trunk.

19. The method of claim 17 further comprising switching calls between said plurality of customer subscriber lines.

20. The method of claim 17 further comprising prioritizing said plurality of customer subscriber lines for access to telecommunications service via said optical test bus.

* * * * *